No. 626,210. Patented May 30, 1899.
H. DEITZ.
HOSE MENDER OR COUPLING.
(Application filed Mar. 4, 1898.)
(No Model.)

Witnesses
Inventor
Henry Deitz
By his Attorney

UNITED STATES PATENT OFFICE.

HENRY DEITZ, OF DENVER, COLORADO, ASSIGNOR TO THE DEITZ MANUFACTURING COMPANY, OF SAME PLACE.

HOSE MENDER OR COUPLING.

SPECIFICATION forming part of Letters Patent No. 626,210, dated May 30, 1899.

Application filed March 4, 1898. Serial No. 672,492. (No model.)

*To all whom it may concern:*

Be it known that I, HENRY DEITZ, a citizen of the United States of America, residing at Denver, in the county of Arapahoe and State of Colorado, have invented certain new and useful Improvements in Hose Menders or Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hose menders or couplings, and while especially designed for use in connection with garden-hose it may be employed in any other relations where a device of the kind may be required.

My object is to provide a hose mender or coupling which shall be simple in construction, economical in cost, and reliable, durable, and efficient in use; and to these ends the invention consists of the features, arrangements, and combinations hereinafter described and claimed, all of which will be fully understood by reference to the accompanying drawings, in which is illustrated an embodiment thereof.

Figure 1:
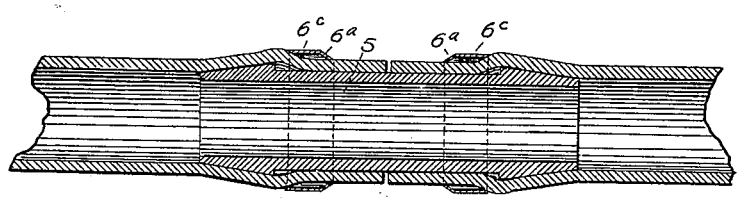
Figure 2:
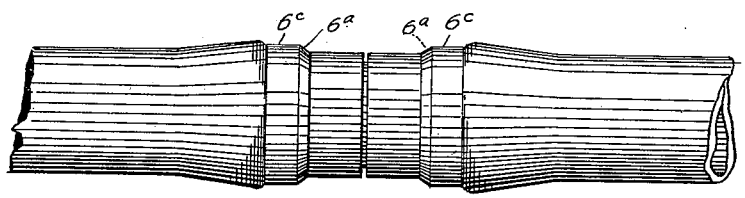
Figure 3:
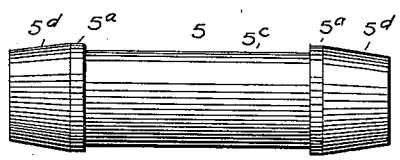
Figure 4:
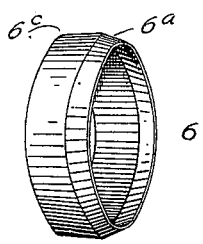

In the drawings, Figure 1 is a vertical longitudinal section taken through my improved hose-mender when in use or applied to the hose. Fig. 2 is a side elevation of the same. Fig. 3 is a detail view of the coupling-tube employed. Fig. 4 is a detail view of one of the gripping-rings.

Similar reference characters indicating corresponding parts in the views, let the numeral 5 designate a coupling-tube, preferably composed of wood, as this material is cheap, light, and answers every requirement. This tube is provided with two shoulders $5^a$, an intermediate portion $5^c$, and tapered extremities $5^d$ to facilitate insertion. This tube 5 is inserted in the hose extremities, (see Fig. 1,) which are locked on the tube by the metal rings 6, each having an interiorly-projecting flange $6^a$ formed on one edge, whereby the caliber or opening in the ring is reduced where the said flange or circular projection is formed. The opposite edge $6^c$ of each ring is of larger caliber, being devoid of the interior projection or flange stated. In use the rings are applied to the hose extremities with their edges $6^c$ turned toward the shoulders $5^a$ of the coupling-tube. When in this position, a longitudinal strain or pull on the hose has a tendency to raise the edge $6^c$ of each ring or to throw it outwardly as it approaches the shoulder $5^a$ of the coupling-tube, thus causing the opposite edge of the coupling-ring to grip the hose more tightly. Hence the greater the strain in an effort to separate the hose extremities the tighter the rings grip the hose, thus making it practically impossible to separate the adjacent hose ends to which my improvement is applied.

In applying the hose-mender the coupling 5 is first inserted in one of the hose extremities to be coupled. One of the gripping-rings is then slipped over the end of the part 5 and passed over the hose extremity in the direction of the shoulder $5^a$, the edge of the ring having the larger caliber being nearer the said shoulder. The flanged edge of the rim is preferably outwardly inclined to facilitate the insertion of the hose extremity therein. It is also preferably exteriorly beveled, as shown in the drawings. After the one gripping-ring has been applied the other is put upon the exposed portion of the coupling part 5, whose other extremity is then inserted in the opposite hose end. The ring is then passed over this hose end and toward the shoulder $5^a$ of the coupling-tube. As heretofore explained, after the device is applied a longitudinal strain on the hose parts has a tendency to cause the rings to grip the hose extremities more tightly, since the hose is expanded beyond the rings by the shoulders $5^a$ of the tube 5.

Having thus described my invention, what I claim is—

1. A hose mender or coupling comprising a coupling-tube having enlarged portions on opposite sides of its central portion, said enlarged portions being adapted to enter the extremities of the hose-sections to be connected, and two thin metal rings having interiorly-projecting inclined flanges formed on their inner edges, or the edges nearer the center of the coupling-tube, the inner surface of each ring having a straight or plane portion extending outwardly from its said flange, thus making the inner edges of the rings of smaller caliber than their outer portions, the said rings being adapted to engage the hose extremities and lock them on the coupling-tube.

2. In a hose mender or coupling, the combination with a coupling-tube having an enlarged portion formed on one side of its central portion, said enlarged portion being adapted to enter the extremity of the hose-section, and a thin metal ring having an interior inclined face formed on its inner edge or the edge nearer the center of the tube, the outer portion of the inner surface of the ring being straight or plane, and of larger caliber than the inner portion, the said ring being adapted to engage the hose extremity and lock it on the coupling-tube.

In testimony whereof I affix my signature in presence of two witnesses.

HENRY DEITZ.

Witnesses:
A. J. O'BRIEN,
EDITH HIMSWORTH.